(12) United States Patent
Kazar et al.

(10) Patent No.: US 7,917,461 B2
(45) Date of Patent: *Mar. 29, 2011

(54) MECHANISM FOR HANDLING FILE LEVEL AND BLOCK LEVEL REMOTE FILE ACCESSES USING THE SAME SERVER

(75) Inventors: Michael L. Kazar, Pittsburgh, PA (US); Richard N. Sanzi, Jr., Wexford, PA (US)

(73) Assignee: NetApp, Inc., Sunnyvale, CA (US)

( * ) Notice: Subject to any disclaimer, the term of this patent is extended or adjusted under 35 U.S.C. 154(b) by 593 days.

This patent is subject to a terminal disclaimer.

(21) Appl. No.: 10/934,002

(22) Filed: Sep. 3, 2004

(65) Prior Publication Data

US 2005/0033748 A1 Feb. 10, 2005

Related U.S. Application Data

(63) Continuation of application No. 09/740,160, filed on Dec. 18, 2000, now Pat. No. 6,868,417.

(51) Int. Cl.
*G06F 17/30* (2006.01)
(52) U.S. Cl. ........................................ 707/100
(58) Field of Classification Search .................. 707/10, 707/100; 709/217; 711/118
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,511,177 A | 4/1996 | Kagimasa et al. | |
| 5,764,972 A | 6/1998 | Crouse et al. | |
| 5,802,366 A | 9/1998 | Row et al. | |
| 5,828,876 A | 10/1998 | Fish et al. | |
| 5,870,734 A | 2/1999 | Kao | |
| 5,897,661 A | 4/1999 | Baranovsky et al. | |
| 5,907,672 A | 5/1999 | Matze et al. | |
| 5,931,918 A | 8/1999 | Row et al. | |
| 5,941,972 A | 8/1999 | Hoese et al. | |

(Continued)

OTHER PUBLICATIONS

"Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Oct. 29, 2007 in United States District Court for the Northern District of California, San Jose Division, Civil Action No. 5:07-cv-05448-JW, 15 pages.

(Continued)

*Primary Examiner* — Etienne P LeRoux
(74) *Attorney, Agent, or Firm* — Cesari and McKenna, LLP

(57) ABSTRACT

An apparatus for handling file level and block level remote file accesses. The apparatus includes a block level server. The apparatus includes a file level server. The apparatus includes a storage layer implementing an inode layer performing inode operations, and storing data accessed by the file level and block level servers. The apparatus includes a management layer connected to the storage layer underlying the block and file level servers, which performs data management operations upon the underlying data. A method of handling file level and block level network file accesses. The method includes the steps of performing management operations by a management layer for a block level server and a file level server. Then there is the step of performing the servers' data accessing and updating operations using a vnode layer implemented on top of an inode layer. Then there is the step of storing data from the block level server or the file level server in a storage layer connected to the management layer.

33 Claims, 6 Drawing Sheets

U.S. PATENT DOCUMENTS

| | | | |
|---|---|---|---|
| 5,944,789 A | 8/1999 | Tzelnic et al. | |
| 5,946,685 A | 8/1999 | Cramer et al. | |
| 5,996,024 A | 11/1999 | Blumenau | |
| 5,996,047 A * | 11/1999 | Peacock | 711/118 |
| 6,065,037 A | 5/2000 | Hitz et al. | |
| 6,173,293 B1 | 1/2001 | Thekkath et al. | |
| 6,173,374 B1 | 1/2001 | Heil et al. | |
| 6,324,581 B1 | 11/2001 | Xu et al. | |
| 6,697,846 B1 * | 2/2004 | Soltis | 709/217 |
| 6,701,449 B1 * | 3/2004 | Davis et al. | 714/4 |
| 6,779,063 B2 | 8/2004 | Yamamoto | |
| 6,807,581 B1 * | 10/2004 | Starr et al. | 709/250 |
| 6,834,326 B1 * | 12/2004 | Wang et al. | 711/114 |
| 6,868,417 B2 * | 3/2005 | Kazar et al. | 707/10 |
| 6,977,927 B1 * | 12/2005 | Bates et al. | 370/381 |
| 2004/0139167 A1 | 7/2004 | Edsall et al. | |

OTHER PUBLICATIONS

"First Amended Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Nov. 2, 2007 in United States District Court for the Northern District of California, San Jose Division, Civil Action No. 5:07-cv-05448-JW, 15 pages.

"Answer and Counterclaims to First Amended Complaint For: (1) Patent Infringement, (2) Unfair Competition Under the Lanham Act, (3) Unfair Competition Under Cal. Bus. & Prof. Code § 17200", filed Dec. 21, 2007 in United States District Court for the Northern District of California, San Francisco Division. Case No. 5:07-cv-05448-JW, 29 pages.

Sun Microsystems Inc.'s Reply to Network Appliance, Inc.'s Answer and Counterclaims to First Amended Complaint, filed Jan. 14, 2008 in United States District Court for the Northern District of California, San Franciso Division. Case No. 5:07-cv-05448-JW, 14 pages.

"Supplemental Answer and Counterclaims to First Amended Complaint For: (1) Patent Infringement, (2) Unfair Competition Under the Lanham Act, (3) Unfair Competition Under Cal. Bus. & Prof. Code § 17200", filed Feb. 19, 2008 in United States District Court for the Northern District of California, San Francisco Division. Case No. 5:07-cv-05448-JW, 28 pages.

"Sun Microsystems Inc.'s Reply to Network Appliance, Inc.'s Supplemental Answer and Counterclaims to First Amended Complaint and Counterclaims For Declaratory Relief", filed Mar. 7, 2008 in United States District Court for the Northern District of California, San Francisco Division. Case No. 5:07-cv-05448-JW, 19 pages.

"Plaintiff-Counterdefendant Sun Microsystems, Inc.'s Preliminary Invalidity Contentions and Accompanying Document Production for U.S. Patent No. 6,868,417", filed May 30, 2008 in United States District Court for the Northern District of California, San Jose Division, Civil Action No. 5:07-cv-05448-JW, 79 pages.

Vahalia, Uresh. "UNIX Internals: The New Frontiers", published by Prentice Hall, copyright 1996, 5 pages (cover-viii).

"Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 34 pages.

"Declaration of Dr. Scott Brandt in Support of Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 7 pages.

"Declaration of Dr. John Hartman in Support of Sun Microsystems, Inc.'s Opening Claim Construction Brief (with Exhibits 1-4)", filed Sep. 15, 2008 in United States District Court for the Northern District of California, San Jose Division, Civil Action No. 5:07-cv-05448-JW, 34 pages.

PCT Notification of Transmittal of the International Search Report or the Declaration, International Application No. PCT/US01/48741, Mail Date Apr. 11, 2002, 7 pages.

"Sun Microsystems, Inc.'s Responsive Claim Construction Brief Concerning the Sun Patent Claim Terms", filed Sep. 29, 2008 in United States District Court for the Northern District of California, San Francisco Division, Case No. 3:07-cv-05488-EDL, 35 pages.

"Declaration of Dr. Martin E. Kaliski in Support of Sun Microsystems, Inc.'s Responsive Claim Construction Brief" (with Exhibits A-D), filed Sep. 29, 2008 in United States District Court for the Northern District of California, San Francisco Division, Case No. 3:07-cv-05488-EDL, 34 pages.

"Declaration of Dr. A.L. Narashima Reddy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv-05488-EDL, 18 pages.

"Declaration of Dr. John Levy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv-05488-EDL, 20 pages.

"NetApp Inc.'s Reply to Sun Microsystems, Inc.'s Responsive Claim Construction Brief", filed Oct. 10, 2008 in United States District Court for the Northern District of California, San Francisco Division, Case No. 3:07-cv-05488-EDL, 19 pages.

"Sun Microsystems, Inc.'s Reply Claim Construction Brief Concerning the NetApp Patent Claim Terms", filed Oct. 10, 2008 in United States District Court for the Northern District of California, San Francisco Division, Case No. 3:07-cv-05488-EDL, 24 pages.

"Declaration of Dr. John H. Hartman in Support of Sun Microsystems, Inc.'s Reply Claim Construction Brief", filed Oct. 10, 2008 in United States District Court for the Northern District of California, San Francisco Division, Case No. 3:07-cv-05488-EDL, 3 pages.

"Declaration of Dr. Scott Brandt in Support of Sun Microsystems, Inc.'s Reply Claim Construction Brief Concerning the NetApp Patent Claim Terms (with Exhibit 1)", filed Oct. 10, 2008 in United States District Court for the Northern District of California, San Francisco Division, Case No. 3:07-cv-05488-EDL, 34 pages.

"Order Construing Claim Terms of the '720 and '417 Patents", filed Dec. 23, 2008 in United States District Court for the Northern District of California, San Francisco Division, Case No. 3:07-cv-05488-EDL, 38 pages.

"Order Regarding Tentative Claim Construction", filed Jan. 14, 2009 in United States District Court for the Northern District of California, San Francisco Division, Case No. 3:07-cv-05488-EDL, 2 pages.

Auspex Systems, "LFS—A Local File System for Multiprocessor NFS Network Servers," <http://www.concentric.net/~ams/auspex/Tech4/Tech4.ch2.html>, (May 29, 1994).

Sunexpert Magazine, "Building a San," <http://www.eurotek.co.uk/pdf/building_a_san.pdf>, p. 50-64, (Mar. 29, 1999).

The Trustrees of Indiana University, "Unix Workstation System Administration Education Certification Course; Chapter Unix Anatomy, Definition of a Filesystem, Physical Disks, Filesystem Basics," <http://www.uwsg.iu.edu/edcert.index_long.html>, (May 29, 1996).

Storage Computer Corporation, "Performance Without Compromise: The Virtual Storage Architecture," Brochure, p. 1-11, (1997).

The Enterprise Storage Company, "Celerra File Server Architecture for High Availability," Brochure, EMC Corporation, p. 1-7, (Aug. 1999).

Sunos 5.9, "Network Disk Driver," Manual, p. 1-3, (Jul. 26, 1985).

Sunos 5.9, "Network Disk Control," Manual, p. 1, (Feb. 1, 1985).

Anthony J. Mcgregor, "Block-Based Distributed File Systems," Book, p. 1-194, (Jul. 1997).

"Expert Report of Mark E. Nusbaum", dated Oct. 12, 2009 in United States District Court for the Northern District of California, San Francisco Division, Case No. 3:07-cv-05488-EDL, 97 pages.

"Opening Expert Report of Scott Brandt, Ph.D., Regarding the Invalidity and Unenforceability of U.S. Patent Nos. 6,868,417 and 7,107,385", dated Oct. 12, 2009 in United States District Court for the Northern District of California, San Francisco Division, Case No. 3:07-cv-05488-EDL, 180 pages.

"Rebuttal Expert Report of Gregory R. Ganger Regarding Validity of U.S. Patent Nos. 6,868,417 and 7,107,385", dated Nov. 4, 2009 in United States District Court for the Northern District of California, San Francisco Division, Case No. 3:07-cv-05488-EDL, 253 pages.

"Rebuttal Expert Report of Cameron K. Weiffenbach", dated Nov. 4, 2009 in United States District Court for the Northern District of California, San Francisco Division, Case No. 3:07-cv-05488-EDL, 21 pages.

"Sun Microsystems, Inc.'s Notice of Motion and Motion for Summary Judgment of Invalidity of NetApp's U.S. Patent No. 7,107,385", dated Dec. 2, 2009, United States District Court for the Northern District of California, San Francisco Division, Case No. 3:07-cv-05488-EDL, 29 pages.

"Order Denying Sun's Motion for Summary Judgment of Non-Infringement of U.S. Patent No. 6,868,417; Granting in Part and Denying in Part Sun's Motion to Strike Supplemental Expert Report of Dr. Ganger; Sustaining NetApp's Objection to Declaration of Jeff Bonwick; and Overruling Sun's Objection to Robert Gittens' Deposition Testimony", dated Mar. 22, 2010, filed in United States District Court for the Northern District of California, San Francisco Division, Case No. 3:07-cv-05488-EDL, 35 pages.

* cited by examiner

MECHANISM FOR HANDLING FILE LEVEL AND BLOCK LEVEL REMOTE FILE ACCESSES USING THE SAME SERVER

RELATED APPLICATIONS

The present application is a continuation of U.S. patent application Ser. No. 09/740,160, filed on Dec. 18, 2000, now issued as U.S. Pat. No. 6,868,417 on Mar. 15, 2005.

FIELD OF THE INVENTION

The present invention is related to handling file level and block level remote file accesses. More specifically, the present invention is related to handling file level and block level remote file accesses with a storage layer implementing an inode layer performing inode operations and storing data accessed by file level and block level servers.

BACKGROUND OF THE INVENTION

Normal NAS file servers export file abstractions via protocols such as NFS and Microsoft's CIFS. SAN protocols, such as Sun's original ND protocol, and various SCSI transport protocols, operate at the disk block level, rather than the file level. There are a number of management operations that can be done at the file level, and that are also useful to have at the block level. These include the ability to make point-in-time copies of a partition, to relocate the contents of a partition efficiently from one physical location to another, and the ability to replicate point-in-time copies of a partition to multiple locations.

SUMMARY OF THE INVENTION

The present invention pertains to an apparatus for handling file level and block level remote file accesses. The apparatus comprises a block level server. The apparatus comprises a file level server. The apparatus comprises a storage layer implementing an inode layer performing inode operations, and storing data accessed by the file level and block level servers. The apparatus comprises a management layer connected to the storage layer underlying the block and file level servers, which performs data management operations upon the underlying data.

The present invention pertains to a method of handling file level and block level network file accesses. The method comprises the steps of performing management operations by a management layer for a block level server and a file level server. Then there is the step of performing the servers' data accessing and updating operations using a vnode layer implemented on top of an inode layer. Then there is the step of storing data from the block level server or the file level server in a storage layer connected to the management layer.

BRIEF DESCRIPTION OF THE DRAWINGS

In the accompanying drawings, the preferred embodiment of the invention and preferred methods of practicing the invention are illustrated in which.

DETAILED DESCRIPTION

Figure 11:
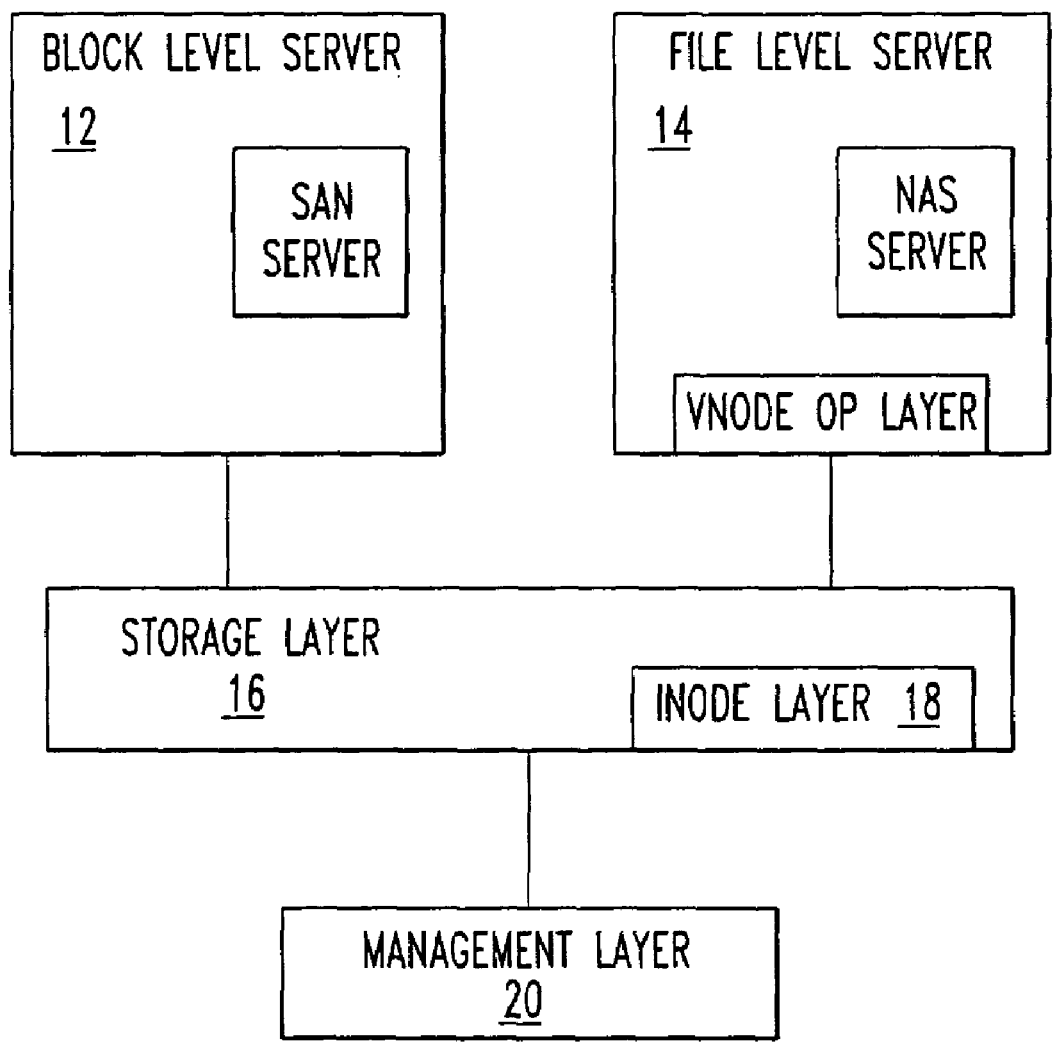
FIG. 11 is a schematic representation of the apparatus of the present invention.

Referring now to the drawings wherein like reference numerals refer to similar or identical parts throughout the several views, and more specifically to FIG. 11 thereof, there is shown an apparatus 10 for handling file level and block level remote file accesses. The apparatus 10 comprises a block level server 12. The apparatus 10 comprises a file level server 14. The apparatus 10 comprises a storage layer 16 implementing an inode layer 18 performing inode operations, and storing data accessed by the file level and block level servers 12. The apparatus 10 comprises a management layer 20 connected to the storage layer 16 underlying the block and file level servers 14, which performs data management operations upon the underlying data.

Preferably, the block level sever includes a SAN server exporting data via SCSI over fibrechannel or SCSI over IP protocols. The file level server 14 preferably includes a NAS server. Preferably, the management layer 20 implements point in time copies, read-only replication, dynamic data relocation or disk space virtualization operations on top of the inode operations performed by the underlying storage layer 16.

The file server preferably includes a vnode operations layer 22. Preferably, the management layer 20 uses space-saving copy-on-write operations provided by the storage layer 16 when processing management requests from the associated NAS or SAN servers. The vnode operations layer 22 preferably uses space-saving copy-on-write operations provided by the storage layer 16 when processing system requests from the associated NAS or SAN servers.

Preferably, the vnode operations layer 22 implements a file system tree of files and directories out of a linear space of inodes provided by the storage layer 16. The vnode operations layer 22 implemented on top of the inode layer 18 preferably includes at least an inode storing all inodes within the file system, and an inode storing the file system's root directory. Preferably, an inode points to data blocks, directly or indirectly, and the copy-on-write management operations create cloned inodes having pointers that point to the same data blocks.

Pointers to data blocks or indirect blocks preferably contain a copy-tree-on-write bit which indicates whether the respective block pointed to by the pointer is also pointed to by another clone inode, the bit being used to determine when to free the respective data blocks when deleting a file, and to determine when to copy the respective data blocks when updating a file. If the block with the bit set points to an indirect block, all blocks pointed to directly or indirectly by that indirect block are treated as if their pointers have the bit set as well.

The present invention pertains to a method of handling file level and block level network file accesses. The method comprises the steps of performing management operations by a management layer 20 for a block level server 12 and a file level server 14. Then there is the step of performing the servers' data accessing and updating operations using a vnode layer implemented on top of an inode layer 18. Then there is the step of storing data from the block level server 12 or the file level server 14 in a storage layer 16 connected to the management layer 20.

Preferably, the performing step includes the step of performing space saving copy-on-write operations using an inode operations layer accessed by the data management layer 20 on data from a NAS or SAN server. The performing step preferably includes the step of implementing, in a vnode layer, a tree of files and directories on top of a linear array of inodes.

Preferably, the performing step includes the steps of performing copy-on-write operations with the inode operations layer whenever a cloned inode is updated by a file or block level operation.

The performing step preferably includes the step of creating a clone of an inode sharing all data and indirect blocks, using the inode operations layer. Preferably, the performing step includes the step of freeing the respective data and indirect blocks when deleting a file from a volume when the copy-tree-on-write bit is clear on one or more of the blocks of the file.

In the operation of the preferred embodiment, the apparatus 10 is structured as a network file server combined with a network block protocol server, with both servers implemented on top of inode layer 18 abstraction. The network file protocol used in the apparatus 10 is Sun Microsystems' Network File System (NFS) The block level protocol used in the apparatus 10 is a protocol providing simple login, read block and write block operations. The NFS server is implemented in terms of a vnode layer, which in turn is implemented on top of the inode layer 18 abstraction.

Figure 1:
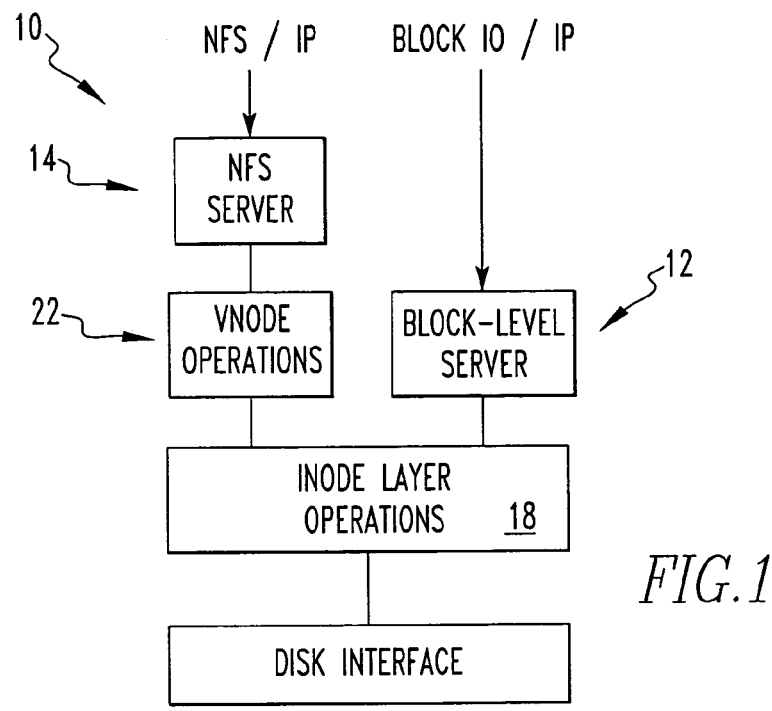
FIG. 1 is a schematic representation of the apparatus of the present invention.

Structurally, the system is shown in FIG. 1.

NFS servers are typically implemented on top of a file system abstracted as a collection of operations, called a vnode layer in this document. In different operating systems, these operations are also sometimes called file operations (Linux). The present invention provides an implementation of this vnode layer, specially augmented to provide other management operations described below.

A suitable implementation of an NFS server built atop a set of vnode operations can be obtained from Red Hat Software or any other Linux distributor. The NFS server implementation will not be described in further detail here since it is well known to one skilled in the art.

The following describes the vnode operations used by the NFS server, and how they are implemented in terms of inode operations. The inode operations used by this layer are very simple:

inode_create(fs_t *file_system, int32_t inode_number, inode_t **inode)
This call creates a new inode. The inode slot in which to create the inode is passed in as the inode_number parameter.
inode_delete(inode_t *inode)
This call deletes an inode, freeing its allocated space.
long inode_get_number(inode_t *inode)
This call returns the 32 bit integer identifying this inode within this file system.
inode_read(inode_t *inode, int64_t offset, char *buffer, long *count)
This call reads count bytes at the specified offset into the specified buffer. The count is updated to indicate the actual number of bytes transferred.
inode_write(inode_t *inode, int64_t offset, char *buffer, long *count)
This call writes *count bytes at the specified offset in the file, obtaining the required data from the buffer.

Figure 2:
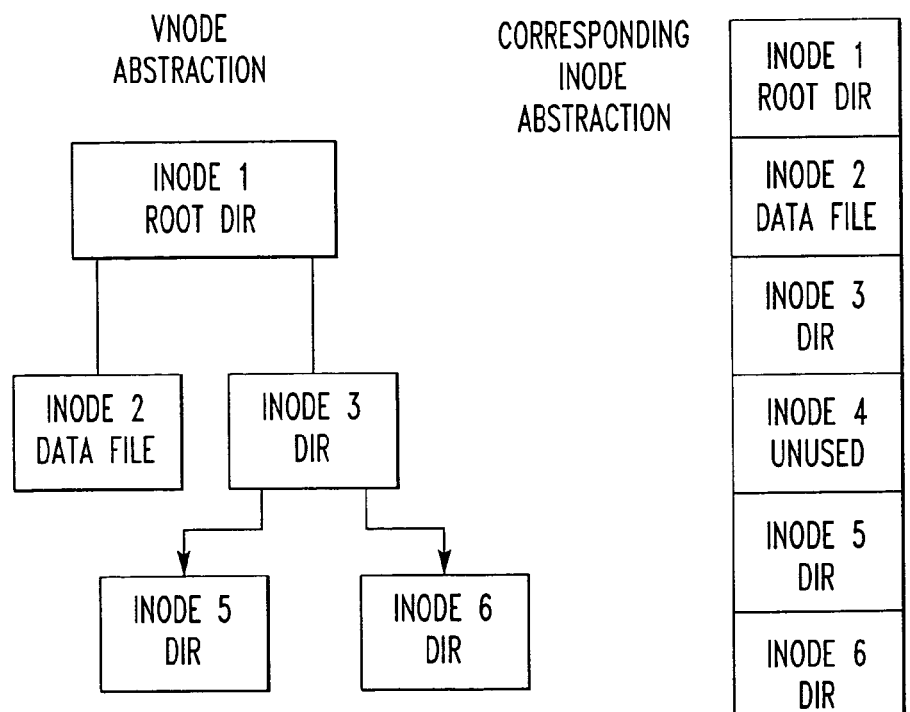
FIG. 2 is a schematic representation of a tree of files and directories out of a linear array of abstract files.

Roughly speaking, the vnode layer implements a tree of files and directories (vnodes) out of a linear array of abstract files (inodes), each of which can contain a file or a directory. FIG. 2 shows this relationship:

The vnode operations used by the NFS server are the following. These operations are implemented in terms of the inode operations above. In the system, the inode layer 18 is further extended with other management operations described below.

The following describes the implementation of the inode operations in terms of reading and writing blocks of data in files. The following describes the implementation of these read and write block operations.

vnode_read(vnode_t *vnodep, int64_t offset, char *buffer, long count)
This call simply calls the inode_read function with the underlying inode implementing this vnode.
vnode_create(vnode_t *dir, char *name, vnode_t **vnode)
This call creates a file with the specified name in the directory identified by the vnode "dir". A vnode corresponding to the new object is returned in *vnode. This operation begins by allocating an inode, which involves searching a bitmap for a 0 entry, indicating that a free inode number is available, and then passing that number to inode_create to create the file. It then writes a record containing the name and new file inode number into the inode containing the directory contents (dir->inode).
vnode_write(vnode_t *vnode, int64_t offset, char *buffer, int32_t count)
This call simply calls the inode_write function with the underlying inode implementing this vnode.
vnode_lookup(vnode_t *dir, char *name, vnode **result)
This call searches the directory whose vnode is specified by the dir parameter for the name specified by the name parameter. It works by searching (using inode_read) the directory for the name. If a record with that name is found, the corresponding inode number is used to create a vnode representing that inode. That vnode is then returned in *result. Otherwise, an error code is returned by this function.
vnode_delete(vnode_t *dir, char *name)
This call deletes a file from a directory. The directory is searched (using inode_read to read its contents) for the specified name. If the record is found with the matching name, the record is updated (using inode_write on the directory vnode) to have the directory record removed that names this file. Then, the inode representing the file is freed by clearing the corresponding bit in the inode allocation bitmap file (indexed by inode number); this is done by reading the inode allocation bitmap file with inode_read, clearing the bit in the record, and writing it back out using inode_write. Finally, inode_delete is called to free up any resources associated with the just-deleted file.
vnode_rename(vnode_t *source_dir, vnode_t *target_dir, char *original_name, char*new_name)
This function renames a file. It is in a sense a combination of a file create and delete, as far as the contents of the directories are concerned. The operation works by searching the source_dir for the specified original_name. Simultaneously, the target_dir is searched (using inode_read) for the new_name. An error is reported unless the original_name exists in the source_dir and the new_name does not exist in the target_dir. If no error is reported, the source_dir record is removed (by calling inode_write on the source_dir), and the inode number is remembered in a temporary memory location. The target directory is then modified to contain new record containing the new_name and the original file's inode number. The operation is then complete.

vnode_mkdir(vnode_t *parent_dir, char *new_dir_name, vnode_t **vnode)

This call works just like create, only the new file is marked as having type "directory", and it is initialized to contain an empty directory header, indicating that there are no records in the directory. The initialization is done by calling inode_write with the newly created vnode.

vnode_rmdir(vnode_t *parent_dir, char *name)

This call removes a directory from its parent directory. The directory being removed must be empty. This call works just like vnode_delete, except that the directory being removed is searched to ensure that it contains no records for any files. This search is done by calling inode_read on the directory being removed. This inode is determined by searching the parent_dir for the record containing the file name "name"; this must be done anyway as part of a file delete. Once the directory record is located and the directory is determined to be empty, the directory record is removed from the parent directory (by calling inode_write on the parent_dir's inode to remove the record), and the inode is freed.

The following describes how the inode layer 18 described above is implemented in terms of disk structures. Aside from the read and write operations described above, the inode structures described here also allow copy-on-write snapshots of inodes. The copy-on-write inodes look like they have a copy of the data stored in the original inode, but store only the differences between the original and the new inode. These can allow backups and snapshots to be performed without using much additional disk space.

A partition consists of a set of file systems, called volumes, which can be referenced by remote users. A NAS volume can be referenced by remote users with file input/output (I/O) requests and contains a set of files in a directory tree, and NAS requests are used to examine the tree, create and delete new files and directories within the tree, and read and write files within the tree. A SAN volume can be referenced by remote users with block input/output (I/O) requests and contains a single file whose blocks represent a virtual disk. The Nth block of the virtual disk corresponds to the Nth block of this file.

A NAS volume always contains at least the following special files:
1. the volume's set of inodes: implemented via a regular (inaccessible) file whose data blocks are interpreted as inodes
2. the inode allocation bitmap: implement as another regular and inaccessible file
3. the root directory of the file system: a standard directory Thus, three inodes in the inode file are reserved. Inode 0 is the inode files inode. Inode 1 is the inode-allocation bitmap, necessary to locate unused inodes efficiently. Inode 2 is the root directory of the file system.

Figure 3:
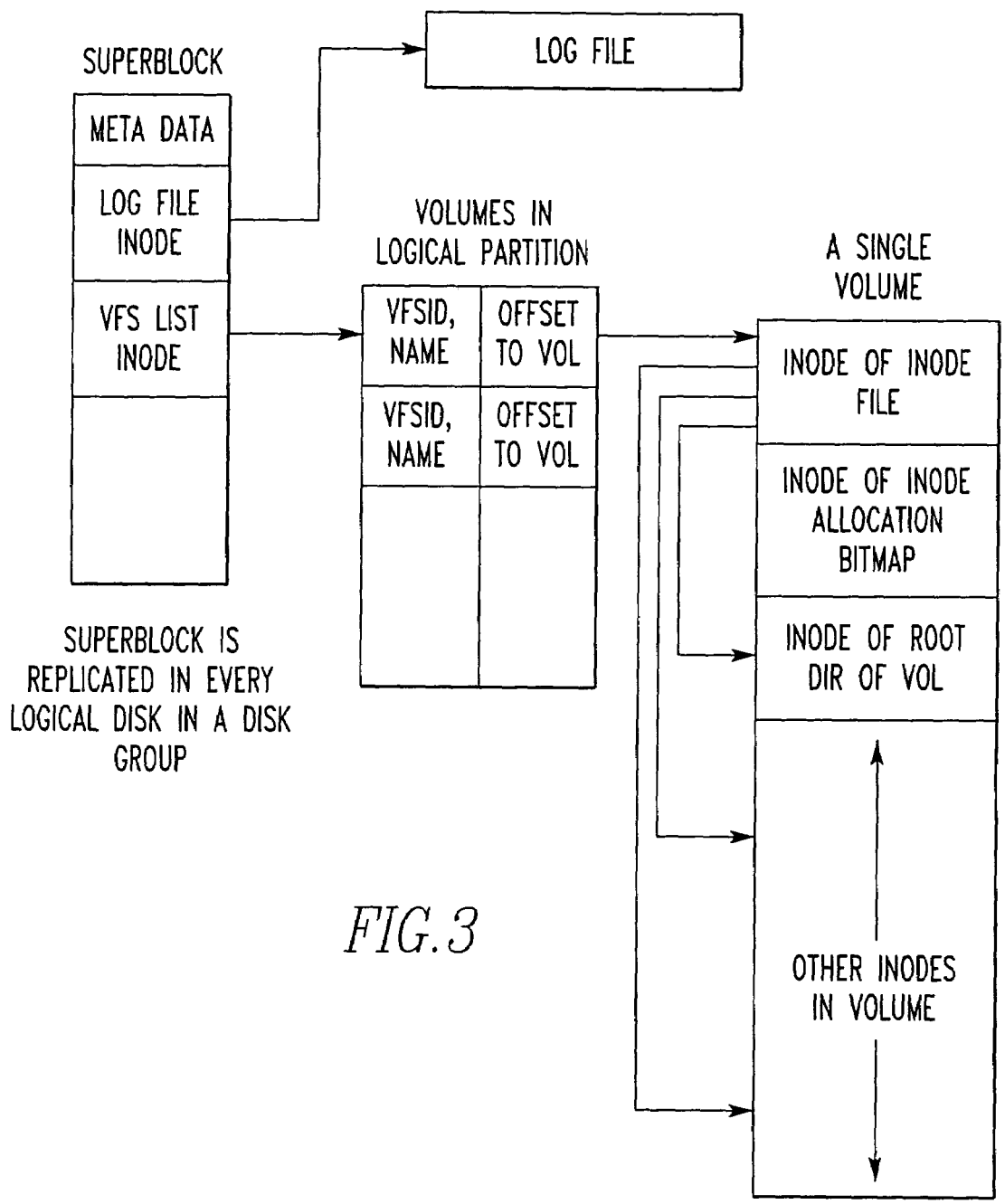
FIG. 3 is a schematic representation of a mapping from a volume's ID to the volumes inode file.

More than one volume can exist in the same physical disk partition. A special file in the partition's superblock, a special block at a fixed location on the disk, contains a mapping from a volume's ID to the volume's inode file. See FIG. 3.

Figure 4:
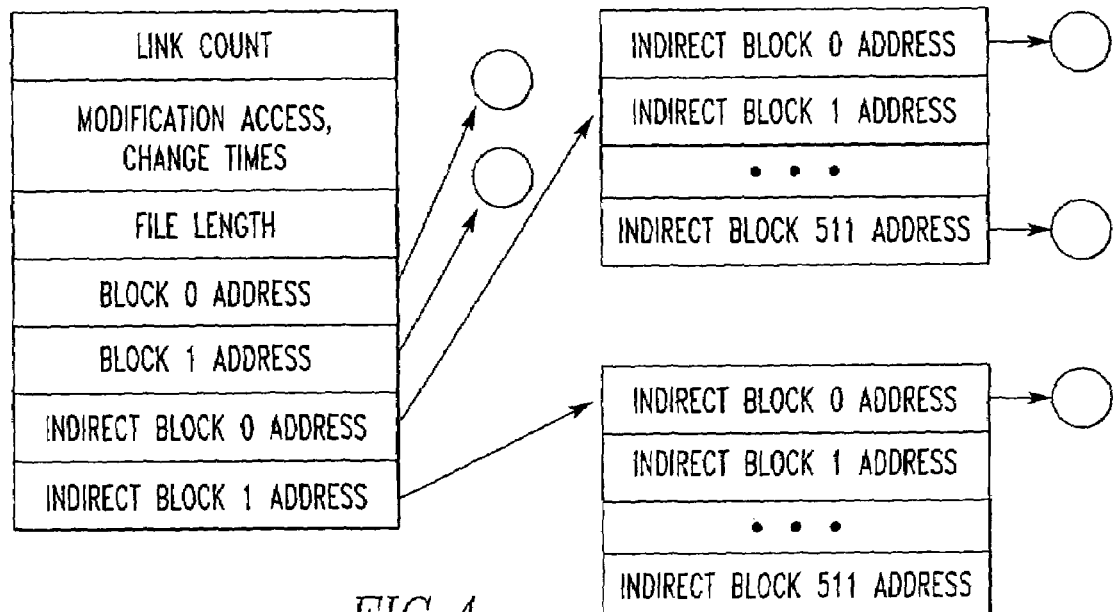
FIG. 4 is a schematic representation of an inode pointing to data blocks.

An inode points to data blocks by giving their address. A inode also contains status information about a file. See FIG. 4. In FIG. 4, (not to scale), the leftmost rectangular block is a 256 byte inode, the round circles are 4K byte data blocks, and the remaining rectangular blocks are indirect blocks: 4K data blocks containing 512 8 byte disk block addresses of data blocks in the file. In the Spinnaker system, an inode contains 10 direct blocks and 4 indirect blocks. The direct blocks point to blocks 0-9 of the file. The first indirect block is a level 1 indirect block, meaning that it contains pointers to data blocks; in this case, the next 512 4K data blocks. The next indirect block is a level 3 indirect block, meaning that each of its 512 pointers points at a level 2 indirect block, each of whose 512 pointers points at a level 1 indirect block, each of whose 512 pointers point to a 4K data block. The level 3 indirect block can thus address an additional 512*512*512 4K data blocks. The next indirect block is a level 5 indirect block, and the last indirect block is a level 8 indirect block. With this structure, a full $2^{64}$ bytes can be addressed within a single file.

The following describes the process of making a copy on write snapshot of a volume. This mechanism can be applied to a NAS volume or a SAN volume. A clone volume is a copy on write snapshot of an existing writeable volume. It appears to be a volume containing the exact same data as the volume it was cloned from. However, it shares all of its disk space with the original volume, and the clone itself is a read-only volume and can not be modified. When a clone is created, each file's inode is copied, with the result that the copied inode points to the same data blocks as the original.

Figure 5:
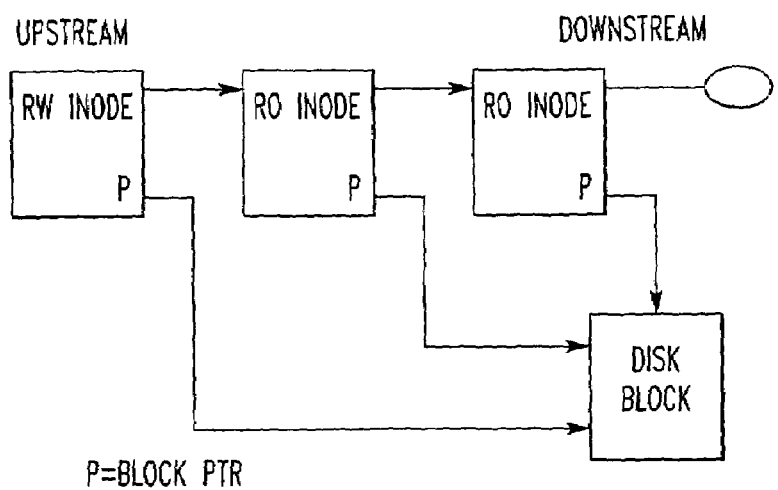
FIG. 5 it is a schematic representation of a copied inode pointing to the same data blocks as the original inode.

Because a cloned set of volumes has several pointers to the same disk block, additional information is required in order to determine when a disk block can actually be freed. When one releases a disk block, one must ensure that all references to it are gone before one can free it. See FIG. 5.

The following describes how disk block addresses can be tagged with an additional bit of information, which can be used to determine when to free a disk block when deleting a volume, or a file from a volume. To efficiently determine the number of references outstanding to a disk block, a bit is borrowed from the block pointer; it is called the "copy tree on write" bit, or CTW for short. A 1 value of the bit means that the block addressed by the pointer is also pointed to by the immediate downstream clone (and perhaps by further downstream clones as well). If the addressed disk block is an indirect block, all deeper disk blocks are also shared as well.

A value of 0 in the bit indicates that there are no downstream clones that hold a pointer to the subtree. A value of 0 however does not indicate that this is the sole reference to the subtree—there may be upstream clones that do have a pointer to it as well. If there are, however, their disk block pointers would have a CTW bit set to 1.

The bit is meaningful for both direct block pointers as well as indirect block pointers. For direct-pointers, the meaning of the bit is as described above. For indirect block pointers, a value of 1 indicates that everything under that tree is shared with the immediately downstream clone and needs to be copied on write.

Figure 6:
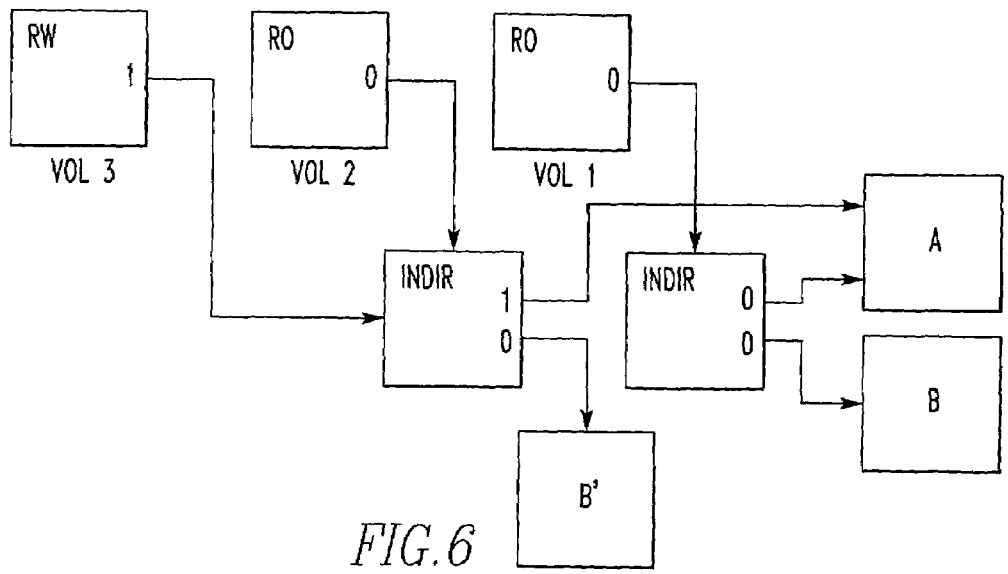
FIG. 6 is a schematic representation of volumes having a copy tree on write bit.

An example is given in FIG. 6. The original volume 1 contains two blocks, A and B. Volume 2 is orginally created as a clone, but then a new block B (labeled as B') is written, resulting in a new indirect block being allocated for volume 2 (so that it can contain a different pointer to block B' than volume 1 does at that file position). The CTW bit of 1 in volume 2's pointer to block A indicates that volume 2 shares its pointer to block A with its immediate downstream volume (volume 1). Volume 3 is created by cloning volume 2, and no additional modification are made. Thus, volume 3's inode references the same indirect block as volume 2, but has the CTW bit set to indicate that the immediate downstream volume (volume 2) also has a pointer to this block.

The actual clone operation is very fast. A cloned inode is created simply by copying the original inode, and then setting the CTW bit on all the direct block pointers and indirect block pointers contained in the inode itself. No modifications to any data blocks or indirect blocks are required at the time a clone is created.

This clone operation is used in building all of the management operations described below. Before describing the management operations, however, how the CTW bit affects how files and volumes are deleted, and how data blocks are written is described. The only volume in a clone chain that can be written is the most upstream volume; all the other clones are read-only volumes, and can not be modified (although they can be deleted).

A write operation walks down the indirect block tree towards the data block being written. If it encounters any pointers to a direct or indirect block having the CTW bit set, the write operation first copies the target block, and then updates the pointer to point to the newly allocated block. The updated pointer is given a CTW bit of 0. If the copied block is an indirect block, all block pointers within that indirect block have their CTW bits turned on in the copy. The write operation then continues down the indirect block tree. Note that because the copying of an indirect block sets the CTW flag in all of its contained disk addresses, once a block with the CTW bit is encountered, all further indirect blocks will be copied until the final data block is reached. In the example above, for instance, a write to block A in volume 3 would first encounter a pointer with the CTW bit set in the inode's pointer to the indirect block. After copying the indirect block, the write operation would encounter the block pointer to block A, which now has the CTW bit set. Thus, a new block needs to be allocated to hold the updated block A', and the indirect block's pointer to A' has the CTW bit cleared.

Figure 7:
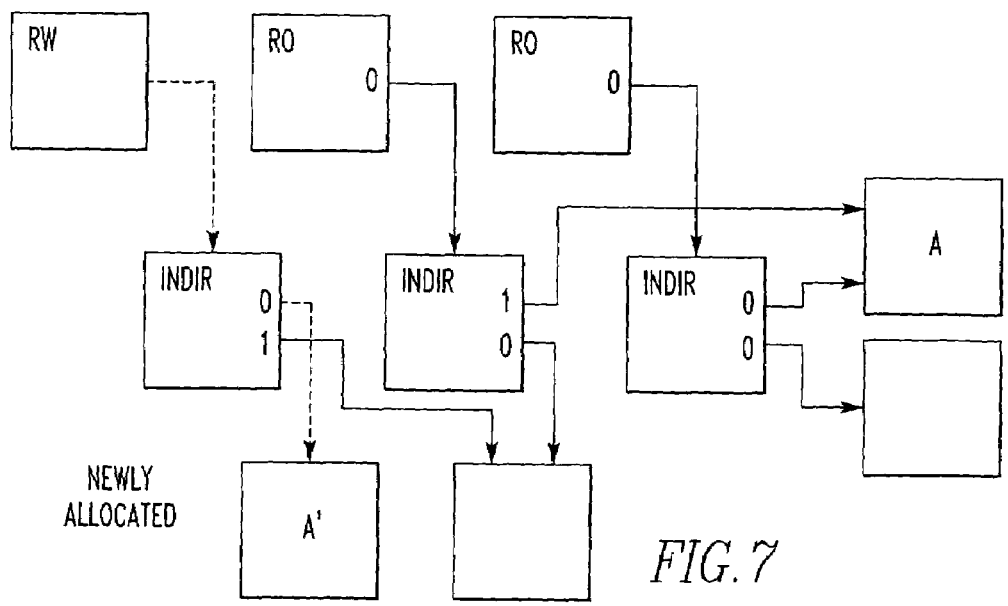
FIG. 7 is a schematic representation of FIG. 6 after a write on block A.

The write operation will thus copy all the blocks (indirect blocks and the final data block) from the first indirect block encountered with the CTW bit set, up to the leaf block where the write happens. Consequently, all these block pointers will be set to 0. All "sibling" pointers along the path can still share data from the clone, and are set to 1 in the copy regardless of their values earlier. For example, FIG. 6 is shown in FIG. 7 after a write on block A. The heavy boxes indicate new allocations. The dashed-pointers indicate new block pointers. The bold-face 0's and 1's indicate copy-tree-on-write bits that were modified.

Similarly, file deletes are very straightforward. File deletes also only happen on the latest clone, since that is the only writeable volume in the clone set. During a file delete, the file system walks over all disk blocks in the indirect block tree associated with the file being deleted. During this depth-first tree walk, if a block address with a CTW bit of 1 is encountered, the tree walk skips the subtree of disk blocks pointed to by that disk block pointer, since the CTW bit indicates that the tree underneath is referenced by the downstream clone, and thus the blocks in that subtree are still in use. Otherwise, a block with a CTW bit of 0 is freed, and all of the blocks pointed to by the block (if it is an indirect block) are processed recursively.

Deleting a clone volume is a little more complex, since this operation may be applied to a clone volume that is not the latest upstream volume. A clone is deleted by simultaneously walking over a file's indirect block tree and the indirect block tree of the corresponding file in the immediately upstream clone. If there is no immediately upstream clone, deleting a clone volume works just as deleting all files in the most upstream cloned, described above. Otherwise, there is an upstream clone. There are four cases, depending upon the state of the CTW bit in the address being examined in the volume being deleted, and the state of the CTW bit in the corresponding address in the upstream clone. If the CTW bit is set in the volume being deleted, all blocks from this point down in the indirect block tree are also referenced by a further downstream clone, and the recursive walk goes no further down this subtree. If the CTW bit is 0 in the volume being deleted, then if the corresponding CTW bit is also clear in the upstream volume, this volume is the only one accessing the disk block, and deletion of the indirect block subtree proceeds recursively down this subtree. If the upstream volume has the CTW bit set, then the upstream clone shares this entire subtree with the volume being deleted, and we will need to pass ownership of this subtree to the upstream clone. This is done by setting the upstream clone's CTW bit to 1, and terminating the recursive traversal of this indirect block subtree.

Given the existence of a clone operation, there are a number of management operations that become easy to implement. A point in time copy of a volume, whether NAS or SAN, can be accomplished directly by making a clone of the volume. The latest clone volume becomes the writeable volume, and the next downstream volume becomes the point in time copy of the writeable volume. The point in time copy then never changes again, and shares as much disk space as possible with the writeable volume, and with older point in time copies that still exist.

Read-only replication of a volume is performed by first making a clone of the volume to be replicated, creating a point in time snapshot of that volume. Then, the contents of that read-only snapshot can be propagated to all the other desired read-only sites. This propagation is performed by converting the contents of the volume into a byte stream, encoding the file status using Sun RPC's external data representation (XDR) format, and file data as an ordinary byte stream.

An existing set of replicas for a volume can be updated to the current contents of the writeable volume by first creating a new clone of the writeable volume. This gives an updated replica at the site of the writeable volume. Then, the new clone volume and the previous replica at that site can be compared by walking down in tandem the indirect block trees for each file in the new clone and the previous replica. If the block addresses at a particular indirect block subtree are identical, then those subtrees must be identical as well, and no further comparisons need to be made for the data underneath that subtree.

This parallel traversal mechanism provides a particularly efficient way of comparing an existing replica with a new release of a replica, and identifying all differences, and only the differences, between those two volumes. The differences can then be propagated to the replicas at each remote site, treating the update as a simple write operation to a clone of the remote replica. The result is that a replica can be propagated out to all remote sites by only sending the data blocks that have changed since the last replica was propagated.

Figure 8:
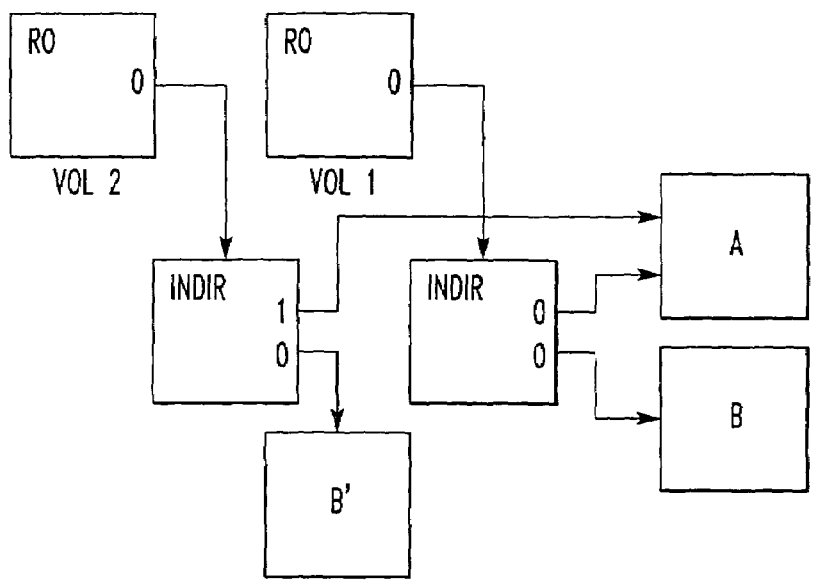
FIG. 8 is a schematic representation regarding replication.
Figure 9:
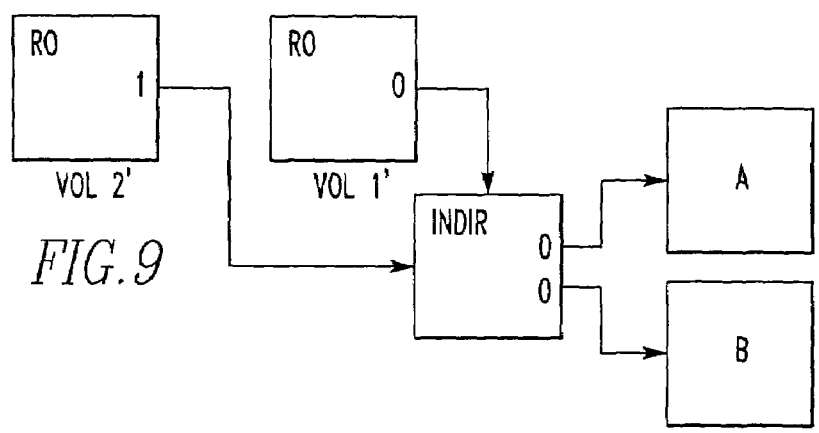
FIG. 9 is a schematic representation regarding replication.
Figure 10:
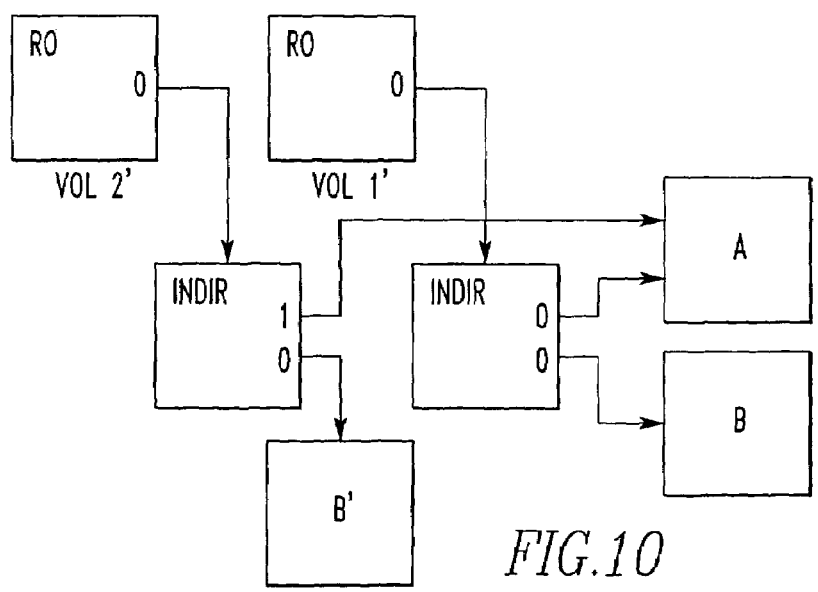
FIG. 10 is a schematic representation regarding replication.

FIG. 8 shows the propagation of the changes between volume 2 and volume 1 to a site containing a replica of volume 1. First, an examination of the changes between volume 1 and volume 2 indicate that block B' is updated by volume 2. This can be seen in FIG. 8. Next, a clone of volume 1' is created at the replica site, getting a volume 2' that is a copy on write version of volume 1'. See FIG. 9. Finally, block B' is written to volume 2', resulting in a copy being made of the shared indirect block, and the newly copied indirect block's pointer to its second block being set to point to B'. See FIG. 10. The result is that the replica site now has the exact same structure as the original site, and volume 2' on the replica contains the same data as volume 2 on the original site.

At this point, volumes 1 and 1' can be removed if desired, since the updated replica has been propagated to both replication sites.

Data relocation consists of moving a volume from one site to another within a cluster. The clone operation makes this simple and efficient, while allowing accesses to continue to the original data, as follows. To move volume 1 from host A to host B, first clone volume 1, so that volume 2 is the read-only clone and volume 1 remains the writeable clone (this requires performing a normal clone operation and then renumbering the volumes so that the writeable volume keeps volume ID 1). Next, copy the read-only data in volume 2 to the new site for the volume, while still allowing updates to occur to volume 1.

Once the copy has completed, compare volumes 2 and 1 using the same mechanism as used by the replica propagator to determine the blocks that differ between the two volumes. Suspending write accesses to volume 1 only during this shorter period, copy the updates from volume 1 to the new site, updating the volume that was just copied there. This should be a relatively small amount of data, since it includes only the data that was updated during the move of the read-only snapshot. Once this operation completes, the volume has been successfully moved to its new site, and the data at the original site can be deleted.

Note that if the amount of data that needs to be copied in the second pass is still too large to copy comfortably while suspending write accesses to the original volume, another clone can be created at the originating site, and the updates can be copied from the clone instead of from the writeable volume. This allows the updates to be propagated without suspending write operations to the original volume, but will require yet another phase to propagate the updates made during this second, shorter, propagation phase. In short, there can be any number of propagation phases, with each one copying a smaller and smaller amount of data. However, the propagation of the last set of updates must be made with write accesses to the original volume being suspended for the duration of the last copy. The duration of this suspension can be made arbitrarily short, however, at the cost of performing the copy phase multiple times (with smaller amounts of data each time).

Disk space virtualization refers to the idea that a volume does not have to be allocated a fixed amount of disk space, but instead can share a large physical partition with other volumes. As disk demands for a particular volume increase, that volume simply allocates space from the partition. Similarly, if files are deleted from a volume, that disk space is made available to other volumes in that partition. The result is that disk space allocation can flow flexibly and automatically between volumes sharing the same physical partition(s).

Note that several physical partitions can be glued together to make a single large logical partition, and a set of volumes can then share that logical partition. This allows the size of a volume to be independent of, and greater than, the size of the largest disk in the storage system.

In addition, if a logical partition needs additional disk space, more physical disks can be attached to the storage system, and the space from these disks can be attached to the end of the existing logical partition. This can be easily done while the system is operating, since the system is simply expanding the maximum disk block address accessible within the logical partition, as soon as the disk(s) come online.

The block level service is a very simple service implemented in terms of the inode layer 18 operations. It consists of three operations implemented on top of a TCP connection.

The block_login operation passes in a user ID and a password, and authenticates the user for the service. Based upon the user, the server chooses a particular file system to which the user's block read and write operations will be applied. This file system must be a SAN file system, which means that it contains one file, whose blocks corresponding directly to the block addresses read or written by the block service client.

The block_read operation passes in a 64 bit offset, and a 32 bit size, and the service retrieves the data at that offset, and sends it back over the TCP connection.

The block_write operation passes in a 64 bit offset, a 32 bit size, and "size" bytes of data. The block server writes that data to the SAN volume's data file at the specified offset.

This block level protocol is very simple. There can be at most one read or write outstanding from the client at a time, which eliminates the need for detailed request identifiers for matching requests with responses.

The format of the above messages are described as C structures encoded as Sun XDR (external data representation):

```
struct block_login_request {
    int opcode = 1;
    char username<32>
    char password<32>
};
struct block_login_response {
    int opcode=1001;
    int code; /* 0 means you win, 1 means you lose */
};
struct block_read_request {
    int opcode = 2;
    int64_t offset;
    int32_t size;
};
struct block_read_response {
    int opcode = 1002;
    int code;
};
struct block_write_request {
    int opcode = 3;
    int64_t offset;
    int32_t size;
};
struct block_write_response {
    int opcode = 1003;
    int code;
};
```

Note that block_write_request messages are followed by exactly "size" bytes of data to be written. Block_read_responses are followed by exactly "size" bytes of the data that was read, if and only if the read response code (error code) is 0.

Note that the entire discussion above is framed in the context of operations on volumes stored on a logical partition. It is of no concern of any of these management operations whether the volume contains a "normal" file system tree accessible via standard NAS protocols such as NFS or CIFS, or whether the volume contain a single file whose contents represent a virtual disk.

The various management operations make sense for either type of volume. Specifically, a point in time snapshot, when applied to a NAS partition, results in a consistent file system snapshot at a given time. Similarly, when applied to a SAN partition, a point in time snapshot contains a snapshot of the virtual disk at a specific time, as if operations had been suspended accessing that disk and a copy had been made and safely stored away. Both NAS and SAN partitions can be meaningfully moved from one site to another, of course. And a read-only SAN partition can be used for, for example, a database that is accessed by a very large number of users, but whose contents, while they must be consistent, need not be perfectly up-to-date. For example, a product catalog is a database for which these semantics might make sense.

Finally, because both NAS and SAN data are represented as volumes with similar implementations, these two types of volumes can share the same pool of disk space, a great convenience for storage system administrators.

In summary, the system allows identical management operations to be applied to both file level (NAS) and block level (SAN) storage structures. The two types of storage structure can share the same pool of available disk space, and can use the same storage servers. This provides a great simplification for storage administrators, since two different storage systems are no longer required for handling block and file level data.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for processing file level and block level remote file accesses, comprising:
   a block level server for serving block level data for a first client;
   a file level server for serving file level data for a second client;
   an inode layer to store both the block level data and the file level data as one or more files, the inode layer using a storage layer to write the files to one or more disks; and
   a management layer usable by the storage layer to perform identical data management operations upon the block level data and the file level data.

2. The apparatus as in claim 1, further comprising:
   the block level sever to export data via SCSI over fibre channel and SCSI over IP protocols.

3. The apparatus as in claim 1, further comprising:
   a NAS server of the file level server.

4. The apparatus as in claim 1, further comprising:
   a SAN server of the block level server to communicate with a SAN client.

5. The apparatus as in claim 1, further comprising:
   the apparatus implements point in time copies, read-only replication, dynamic data relocation, and disk space virtualization operations.

6. The apparatus as in claim 1, further comprising:
   a vnode operations layer of the file level server.

7. The apparatus as in claim 1, further comprising:
   the storage layer storing the block level data and the file level data.

8. The apparatus as in claim 7, further comprising:
   the storage layer implements the inode layer, and the inode layer performs inode operations and stores the file level data and the block level data.

9. A method for an apparatus to process file level and block level remote file accesses, comprising:
   serving block level data by a block level server for a first client;
   serving file level data by a file level server for a second client;
   storing, by an inode layer, the file level data and the block level data as one or more files, the inode layer using a storage layer to write the files to one or more disks; and
   providing a management layer usable by the storage layer to perform identical data management operations upon the block level data and the file level data.

10. The method as in claim 9, further comprising:
    exporting data by the block level server via SCSI over fibrechannel and SCSI over IP protocols.

11. The method as in claim 9, further comprising:
    including a NAS server in the file level server.

12. The apparatus as in claim 9, further comprising:
    including a SAN server in the block level server to communicate with a SAN client.

13. The method as in claim 9, further comprising:
    implementing point in time copies, read-only replication, dynamic data relocation, and disk space virtualization operations.

14. The method as in claim 9, further comprising:
    including a vnode operations layer in the file level server.

15. The method as in claim 9, further comprising:
    storing by, the storage layer, the block level data and the file level data.

16. The method as in claim 9, further comprising:
    implementing the inode layer in the storage layer, and the inode layer performing inode operations and storing the file level data and the block level data.

17. An apparatus, comprising:
    a computer readable storage disk containing instructions for execution on a processor for a method of processing file level and block level remote file accesses, having,
    serving block level data by a block level server for a first client;
    serving file level data by a file level server for a second client;
    storing by an inode layer the file level data wand the block level data as one or more files, the inode layer using a storage layer to write the files to one or more disks; and
    providing a management layer usable by the storage layer to perform identical data management operations upon the block level data and the file level data.

18. An apparatus for processing file level and block level remote file accesses, comprising:
    a block level server to serve block level data for a first client;
    a file level server to serve file level data for a second client;
    an inode layer to store the file level data and the block level data as one or more files, the inode layer using a storage layer to write the files to one or more disks; and
    a management layer to perform identical data management operations upon the block level data and the file level data.

19. The apparatus as in claim 18, further comprising:
    the block level sever can export data via SCSI over fibre channel and SCSI over IP protocols.

20. The apparatus as in claim 18, further comprising:
    a NAS server of the file level server.

21. The apparatus as in claim 18, further comprising:
    a SAN server of the block level server to communicate with a SAN client.

22. The apparatus as in claim 18, further comprising:
    the apparatus implements point in time copies, read-only replication, dynamic data relocation, and disk space virtualization operations.

23. The apparatus as in claim 18, further comprising:
    a vnode operations layer of the file level server.

24. The apparatus as in claim 18, further comprising:
    the storage layer storing the block level data and the file level data.

25. A method for an apparatus to process file level and block level remote file accesses, comprising:
   serving block level data by a block level server for a first client;
   serving file level data by a file level server for a second client;
   storing by an inode layer the file level data and the block level data as one or more files, the inode layer using a storage layer to write the files to one or more disks; and
   providing a management layer to perform identical data management operations upon the block level data and the file level data.

26. The method as in claim 25, further comprising:
   exporting data by the block level server via SCSI over fibrechannel and SCSI over IP protocols.

27. The method as in claim 25, further comprising:
   including a NAS server in the file level server.

28. The apparatus as in claim 25, further comprising:
   including a SAN server in the block level server to communicate with a SAN client.

29. The method as in claim 25, further comprising:
   implementing point in time copies, read-only replication, dynamic data relocation, and disk space virtualization operations.

30. The method as in claim 25, further comprising:
   including a vnode operations layer in the file level server.

31. The method as in claim 25, further comprising:
   storing the block level data and the file level data by the storage layer.

32. The method as in claim 25, further comprising:
   implementing the inode layer in the storage layer, and the inode layer performing inode operations and storing by the file level data and block level data.

33. An apparatus, comprising:
   a computer readable storage disk containing instructions for execution on a processor for a method of processing file level and block level remote file accesses, having,
   serving block level data by a block level server for a first client;
   serving file level data by a file level server for a second client;
   storing by an inode layer the file level data and the block level data as one or more files, the inode layer using a storage layer to write the files to one or more disks; and
   providing a management layer to perform identical data management operations upon the block level data and the file level data.

* * * * *

UNITED STATES PATENT AND TRADEMARK OFFICE
CERTIFICATE OF CORRECTION

| | | |
|---|---|---|
| PATENT NO. | : 7,917,461 B2 | Page 1 of 1 |
| APPLICATION NO. | : 10/934002 | |
| DATED | : March 29, 2011 | |
| INVENTOR(S) | : Michael L. Kazar et al. | |

It is certified that error appears in the above-identified patent and that said Letters Patent is hereby corrected as shown below:

Col. 3, Line 35, please replace "(NFS) The" with --(NFS). The--

Col. 12, Line 34, please replace "wand" with --and--

Signed and Sealed this
Twenty-first Day of June, 2011

David J. Kappos
*Director of the United States Patent and Trademark Office*